United States Patent [19]
Ayres

[11] Patent Number: 5,600,505
[45] Date of Patent: Feb. 4, 1997

[54] SKEW CORRECTION IN A MULTI-TRACK TAPE RECORDER/PLAYER

[75] Inventor: Mark R. Ayres, Whitmore Lake, Mich.

[73] Assignee: Exabyte Corporation, Boulder, Colo.

[21] Appl. No.: 258,425

[22] Filed: Jun. 10, 1994

[51] Int. Cl.⁶ .......................... G11B 5/584; G11B 15/48
[52] U.S. Cl. ...................... 360/77.12; 360/74.4
[58] Field of Search ................... 360/75, 77.02, 360/77.12, 46, 53, 63, 74.1, 74.4

[56] References Cited

U.S. PATENT DOCUMENTS

| | | | |
|---|---|---|---|
| 3,292,168 | 12/1966 | Gray | 340/174.1 |
| 3,541,270 | 11/1970 | Walther | 179/100.2 |
| 4,313,141 | 1/1982 | Yanagida et al. | 360/78 |
| 4,422,111 | 12/1983 | Moeller et al. | 360/48 |
| 4,476,503 | 10/1984 | Solhjell | 360/75 |
| 4,562,494 | 12/1985 | Bond | 360/75 |
| 4,563,713 | 1/1986 | Cahoon et al. | 360/75 |
| 4,609,959 | 9/1986 | Rudi | 360/106 |
| 4,679,104 | 7/1987 | Dahlerud | 360/78 |
| 4,866,548 | 9/1989 | Rudi | 360/77 |
| 5,001,580 | 3/1991 | Aranovsky et al. | 360/77.12 |
| 5,299,074 | 3/1994 | Sukigara et al. | 360/77.07 |
| 5,343,341 | 8/1994 | Jahren | 360/77.12 |
| 5,367,414 | 11/1994 | Kelly et al. | 360/77.12 |

Primary Examiner—Won Tae C. Kim
Assistant Examiner—Regina Y. Neal
Attorney, Agent, or Firm—Gifford, Krass, Groh, Sprinkle, Patmore, Anderson & Citkowski

[57] ABSTRACT

In a multi-track magnetic tape recorder/player of the type used for data storage and retrieval, with at least one read head and one write head, both being displaceable laterally relative to the direction of tape travel, and a memory to store values representative of those lateral displacements with respect to a reference position, a method for exact positioning of the read head onto previously written data tracks. In the preferred method, the write head is used to record (or erase) a longitudinal stripe along the tape, and the read head is used to find one or more edges of the stripe relative to a reference position. The displacements used to write the stripes and the displacements associated with the edges are compared to generate an offset correction factor used for subsequent head positioning.

20 Claims, 5 Drawing Sheets

SKEW CORRECTION IN A MULTI-TRACK TAPE RECORDER/PLAYER

FIELD OF THE INVENTION

This invention relates to magnetic tape recorder/players of the type used for data storage and retrieval and, more particularly, to the positioning of the read/write heads within such recorder/players to correct for tape misalignment.

BACKGROUND OF THE INVENTION

Magnetic tape recorder/players of the type applicable to the present invention are typically used to back-up data stored on nonremovable disks in computers. Nonremovable disks are very convenient, but stored data may be lost due to operator error or mechanical or electrical failure. Thus, it is safest to periodically back-up the data stored on these nonremovable disks by recording it on another nonvolatile memory medium.

The magnetic tape recorder/player provides an answer to the problem of backing up nonremovable disks by storing data on a magnetic tape within a cartridge. A single tape cartridge will usually have sufficient capacity to back up all the data on a single nonremovable disk, but there is an ever increasing need for cartridges having larger and larger data capacities. Such increasing data densities rely on smaller data tracks on the magnetic tape which, in turn, require more precise head positioning for reliable data retrieval.

High-capacity magnetic tape recorder/players incorporate multiple read and/or write/erase heads, typically mounted on a single head block. Ideally the heads are in perfect alignment with the centerline of tape movement so there are no errors introduced as the tape moves relative to the heads. Usually, however, errors are introduced in manufacturing the tape cartridge or the recorder/player. One measurement of this error is called tape skew, which takes into account the angle that the tape makes with respect to its own cartridge (slope), the angle that the cartridge makes with respect to the heads, and azimuth, the angle the gap of a head makes with respect to a data track.

At any point on the tape the skew tends to be in the same direction, so if the tape is always written in the same direction some skew problems would be minimized. In practice however, tapes are written and played in both directions. This can lead to several technical problems. The read head may actually leave the writer path, resulting in a serious problem which cannot be corrected. Another symptom of tape skew manifests itself as tracks being written offset relative to one another. For example, if skew is sufficiently pronounced, the data track closest to the center of the tape written in one direction may collide with the data track closest to the center of the tape written in the opposite direction. This problem is not solved by increasing the gap between the two center tracks because increasing the gap could push the outermost tracks off the edge of the tape and limit capacity. Clearly, if magnetic tape cartridges are to continue their increase in capacity an accurate and reliable means to correct for skew errors is required.

Various techniques have been proposed to correct for at least some aspects of tape misalignment. For example, according to Cahoon et al., U.S. Pat. No. 4,563,713, the read head is used to scan the beginning of the tape and locate the lower and upper edges of a reference track. From these edges, the centerline of the track is determined and used for accurate positioning of the head block onto other tracks. This technique is limited by the fact that a track, which may itself be misaligned, is used as a reference position.

The U.S. Pat. No. 4,866,548 to Rudi improves upon the Cahoon method by using the edge of the tape, as a reference position. After locating the edge, a stripe is written on the tape and the outer edges of the stripe are used to calculate a midpoint value. The distance between write position and midpoint of read positions is used to calculate an error value. This error value is then compared to the value used to position the head block during writing and the difference, if any, is used to more accurately position the head block onto the other tracks.

One disadvantage of the Rudi method is that both edges of a reference stripe must be located. In practice, if the lateral dimensions of the read and write/erase heads are known, a more general method is possible which involves the location of only one edge of a reference stripe or multiple stripes, which may then be averaged with other error calculations, if necessary, to determine an overall correction factor.

SUMMARY OF THE INVENTION

The present invention provides a method for determining tape alignment error for exact head positioning in a tape recorder/player. In terms of apparatus, the invention presumes a multi-track tape drive having at least one read head and one write/erase head, the heads being displaceable laterally with respect to the movement of tape travel, and a memory operative to store signals representative of such displacements. The method according to the invention begins with the step of recording a longitudinal stripe along at least a portion of said tape using the write/erase head. The displacement associated with this recording step is stored in the memory as a value "A." One edge of this longitudinal stripe is then located using the read head, and the value of the associated displacement is stored in the memory as value "B."

At any time during the process an expected offset value "D" may be determined with regard to the difference between the values of "A" and "B." The value of "D" bears some relation to the lateral width of the read and write/erase heads, depending on physical or electrical factors such as amplitude. Typically, assuming a zero-amplitude seek, the value of "D" may be taken to be equal to one-half the transverse width of the read head plus one half the transverse width of the write/erase head. An alignment error "E" is then calculated in accordance with the formula E=(A±D−B), with the choice of positive or negative sign depending upon which edge of the stripe was previously located by the read head. This value of "E" is then used to adjust the positioning of the head block when writing.

While the technique specified above may operate efficiently and accurately in some circumstances, the results may be unacceptable if the value of "D" is poorly controlled. To correct for this deviation, in the preferred embodiment, the steps set forth above are performed on opposing edges of the written stripe, then averaged. That is, a first alignment error associated with one edge of the longitudinal stripe is located and recorded, then a second alignment error associated with the other edge of the longitudinal stripe is located and recorded. Finally, a total alignment error is calculated by averaging the first and second alignment errors.

In an alternative embodiment, the first edge located and positionally stored may be associated with a longitudinal stripe having been erased using the write/erase head from a wider, previously recorded field. For the purposes of averaging, the opposing edge of the erased stripe may conveniently be used. In yet a further alternative embodiment, the second edge may be associated with a second stripe, whether formed though writing or erasure, with the average being taken between two inwardly facing edges of the two stripes or two outwardly facing edges of the two stripes.

BRIEF DESCRIPTION OF THE DRAWINGS

These and other objects and aspects of the present invention will become clear from the following descriptions of the invention, in which.

DETAILED DESCRIPTION OF THE PREFERRED EMBODIMENT

The present invention provides a method for accurately positioning the write/erase head onto a desired data track in a multi-track a magnetic tape recorder/player, the process involved being more general than prior-art teachings. Specifically, the invention is a method for controlling the lateral position of a read/write head to account for skew in a multi-track magnetic tape recorder/player. The recorder/player includes means to position the read/write head laterally across the tape; that is, substantially perpendicular to the direction of tape travel. The positioning means, for example those of the type utilizing stepper motors, are well known in the art of tape deck technology. The recorder/player further includes storage means to record the lateral position of the read/write head relative to a reference position, with this recorded value then being used to locate the head at various points on the tape.

Figure 1:
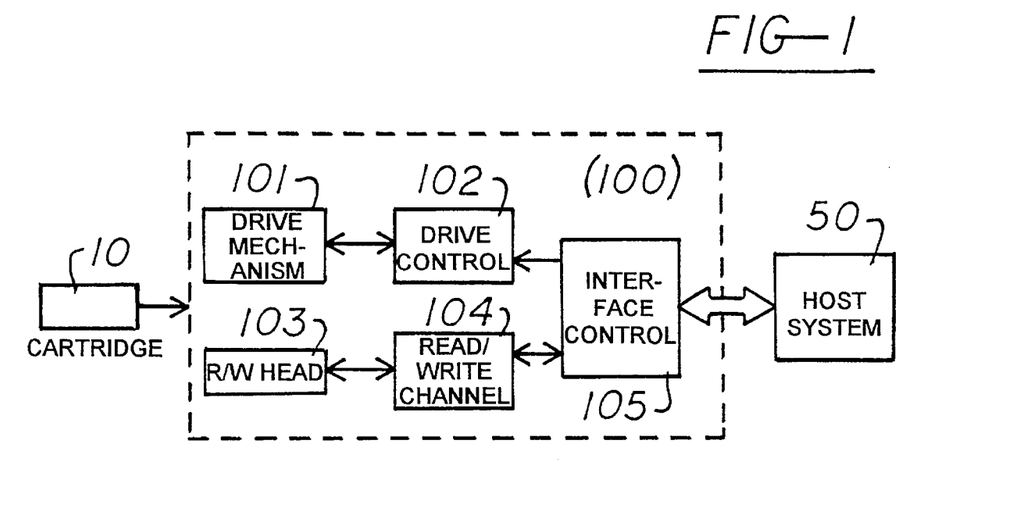
FIG. 1 is a block diagram of the components of a typical magnetic tape recorder/player to which this invention is applicable.

In a typical installation the magnetic tape recorder/player provides data backup capability for a desktop computer or workstation. FIG. 1 illustrates magnetic tape recorder/player system. Magnetic tape recorder/player system 100 includes a drive mechanism 101, a drive controller 102, a read/write head 103, read/write channels 104 and an interface controller 105. Drive mechanism 101 couples to tape cartridge 10 and imparts tape movement relative to read/write head 103. Drive controller 102 controls drive mechanism 101 for starting and stopping tape movement in either direction and to ensure the tape speed is within allowable limits.

During tape movement read/write head 103, which is in contact with the tape, either retrieves data from the tape or stores data on the tape. The read/write head includes a write magnetic gap having a width which is typically equal to the tape track width and a following read magnetic gap having a smaller width. The smaller width of the read magnetic gap is about of one half the track width. The preferred embodiment employs 40 data tracks of 6 mils width on a tape having a width of 0.247 inches. Read/write head 103 preferably writes tracks of 6 mils width and reads tracks of 3.5 mils width. The narrower read width permits reliable read operation with less exacting mechanical tolerances than needed with equal read and write widths.

Separate electronic channels in read/write channels 104 permit control of simultaneous read and operations. Simultaneous read and write operations are used generally to immediately confirm the correct storage of data on the tape to indicate whether the data storage operation was successful. Interface controller 105 permits magnetic tape recorder/player system 100 to operate as a peripheral to host system 50. Controller 105 includes the electronics necessary to enable host system 50 to control data storage and retrieval on the magnetic tape within cartridge 10.

Figure 2:
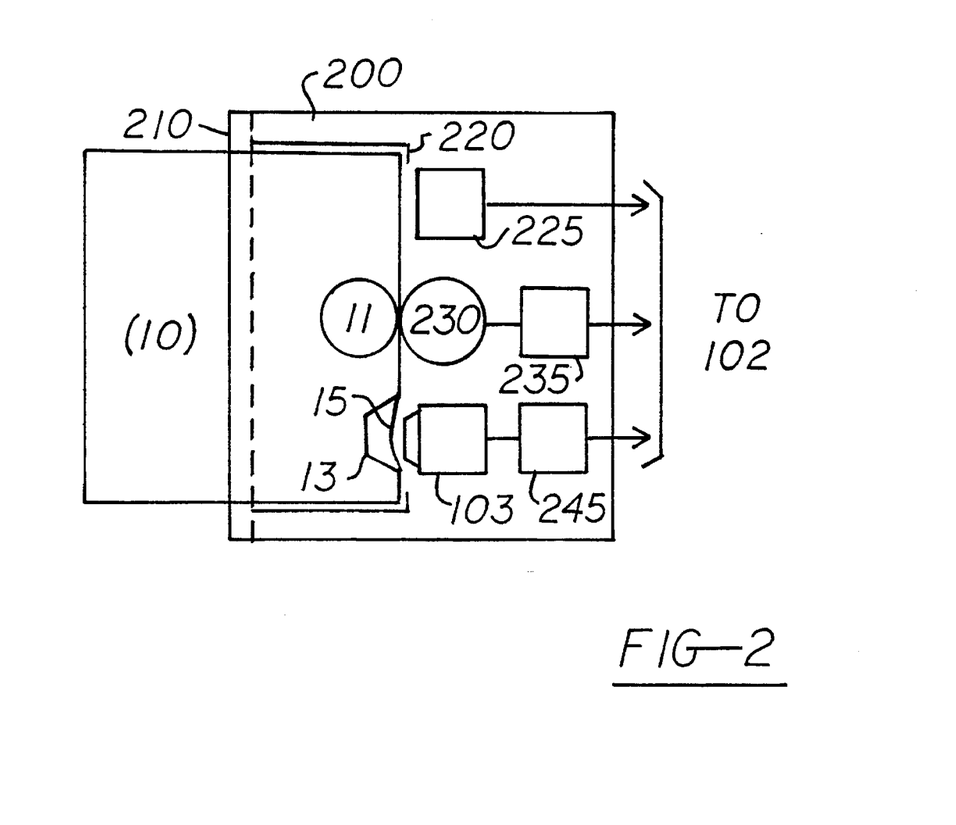
FIG. 2 is a schematic illustration of the interaction between the tape cartridge and the magnetic tape recorder/player.

FIG. 2 schematically illustrates aspects of the physical interface of cartridge 10 and magnetic tape recorder/player system 100. Cartridge 10 inserts into an opening in the front panel 210 of platform 200. Cartridge positioner 220 positions the inserted end of cartridge 10 for proper interface. Cartridge sensor 225 detects the presence of a cartridge 10 and signals drive controller 102. Capstan servomotor 235 controls tape motion including starting, stopping and speed control in both directions. Capstan servomotor 235 communicates with drive controller 102 to produce the desired tape operation at the proper tape speed.

Cartridge 10 includes notch 13 that receives read/write head 103. When a cartridge 10 is properly positioned within magnetic tape recorder/player system 100, read/write head 103 abuts tape 15 for data storage and retrieval. As will be further described below, type 15 includes plural longitudinal data tracks disposed at differing lateral positions. Head positioning stepper motor 245 controls the lateral position of read/write head 103. This permits selection of the appropriate data track for reading or writing data.

Figure 3:
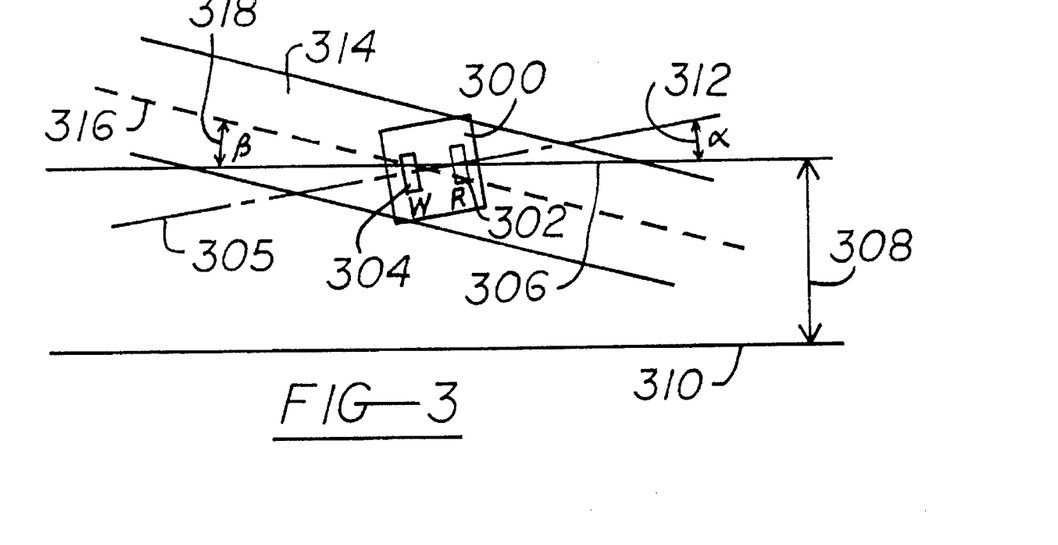
FIG. 3 is an illustration with dimensional exaggerations to show sources of tape skew misalignment, including azimuth and slope errors.

FIG. 3 illustrates major sources of tape misalignment. The scale of the drawing and the angles depicted therein are exaggerated to better illustrate such misalignments. Magnetic head 300 includes at least one write head 304 and one read head 302. Ideally, a line drawn through the centers of these heads 305 should be parallel with the longitudinal axis of tape 314 and a reference line 310. However, head 300, displaced a distance 308 from the reference line 310 may be turned relative to the reference line creating an angle alpha (312) resulting in azimuth error. A major source of error results if the tape is tilted relative to the reference line 310, resulting in angle beta (318) shown between tape center line 316 and line 306 parallel with reference line 310. Angle beta is sometimes called slope error. Together, angles alpha and beta make up what is commonly referred to as tape skew.

Figure 4:
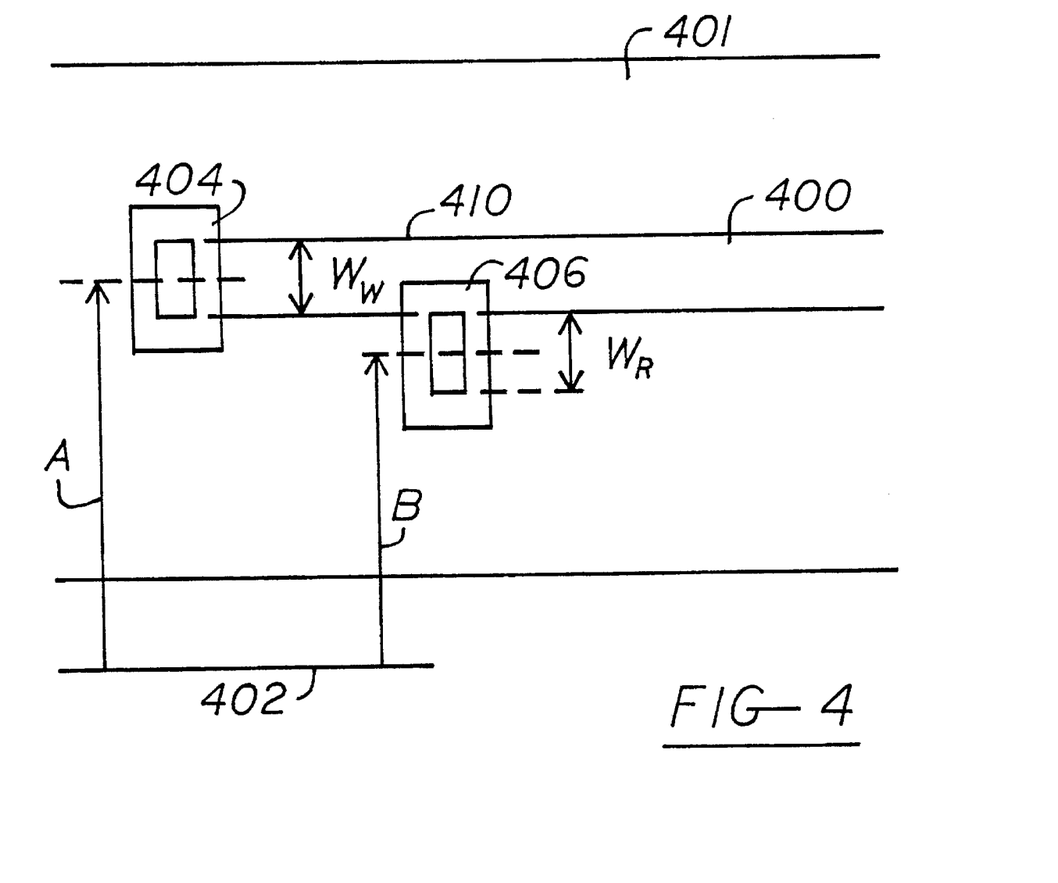
FIG. 4 illustrates a preferred method of the present invention.

FIG. 4 is a schematic drawing which will be used to illustrate the generalized method of determining tape misalignment according to the present invention. A stripe 400 is written longitudinally along at least a portion of the tape 401 at a displacement "A" relative to a reference position 402. Reference position 402 may be an edge of the tape, a track or other recordings made on the tape, or a physical entity such as an end-of-travel switch. Next, using the read head 406, an edge of the stripe 400 is located and once located a value "B" is stored associated with this displacement from reference position 402.

Before or during the operations just described, an anticipated offset error between displacements "A" and "B" is stored which bears a relationship to the widths of the write/erase head 404 and the read head 406. Nominally, at zero amplitude, this expected offset is equal to one half the width of the write/erase head, $W_w$, and one half the width of the read head 406, $W_r$. Given this expected offset value, which is stored as value "D", an alignment error may be calculated according to the formula E=(A±D−B), where the sign of the value of "D" depends upon whether the edge located with the read head is that closest to, or furthest from (point 410), the reference.

This method of finding one edge and using an anticipated offset based upon the widths of the write/erase and read heads is most general, and, in ideal circumstances will efficiently lead to a sufficiently accurate result. In practice, however, it may the case that the single-edge method is unacceptable in the event that the value of "D" is poorly controlled in which case a second operation may be performed with read head 406 to form an opposing edge 410 of the stripe 400 then averaging the results. Using opposing edges of the stripe 400, the value of "D" will cancel, as both positive and negative values will be present, thereby rendering an accurate and repeatable result.

In practice, it is necessary to pre-erase the area where the edge will be detected. If only one edge is to be detected, a single pass of the write/erase head will suffice. If both edges are sought, two erase passes must ordinarily be performed.

Figure 5:
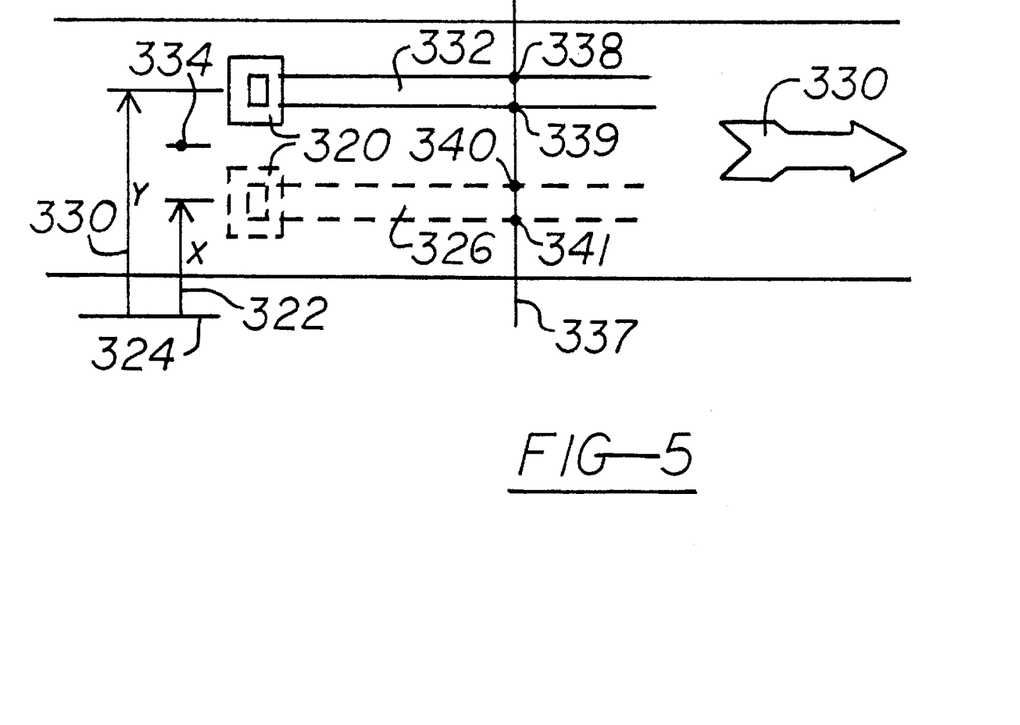
FIG. 5 illustrates an alternative method of the invention using two written strips.

FIG. 5 illustrates an alternative method, wherein write head 320 is displaced a distance "X" 322 from reference line 324 and a stripe 326 is written on tape 328 traveling in the direction depicted by 330. Next, the tape is reversed and write head 320 is displaced from its previous position on tape 328 by a distance "Y" 330 from reference line 324 and a second stripe 332 is written on tape 328 again moving in direction 330. The tape is again reversed and the read head is used to sense the magnetization of stripes 326 and 332. By examining magnetized and unmagnetized portions of tape 328 along line 337, the edges of stripes 326 and 332 may be ascertained using read head 335. In one version of an alternative method, read head 335 is used to locate the inwardly facing edges 339 and 340 of stripes 332 and 326, respectively. In a different version of this alternative, read head 335 is moved along line 337 to locate the outwardly facing edges 341 and 338 of stripes 326 and 332, respectively.

Regardless of whether read head 335 is used to locate inwardly facing or outwardly facing edges of stripes 326 and 332, a first correction factor is determined in conjunction with the first edge in accordance with the method described with reference to FIG. 4, then a second correction factor is calculated in conjunction with the second edge associated with the second stripe, and a final alignment error "E" is then calculated by averaging the values associated with the two edges of the two stripes. The set of inwardly facing edges or outwardly facing edges may be used as alternatives, so long as the calculations take position and negatives values into account relative to the reference.

Figure 6A:
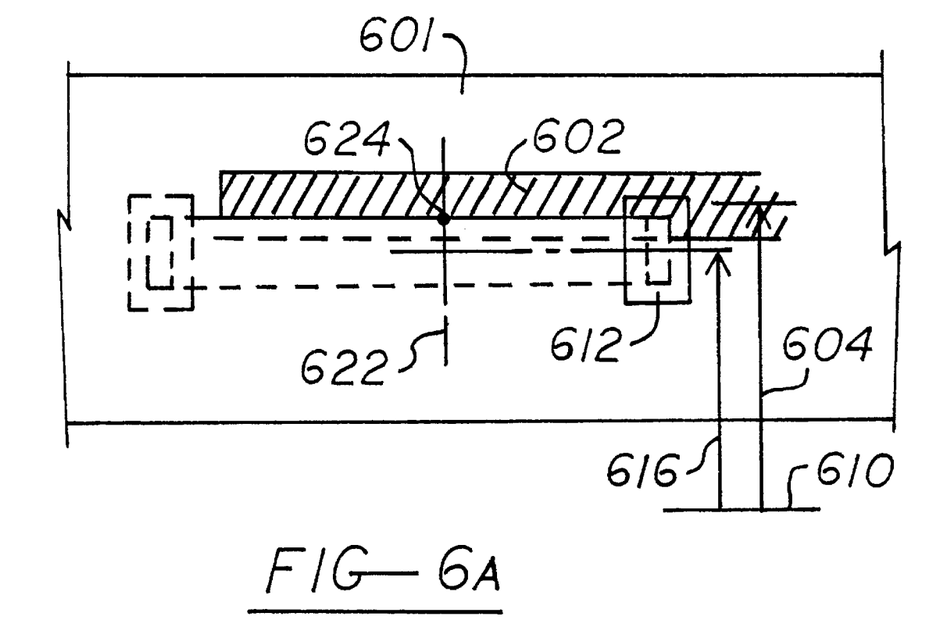
FIGS. 6A–6E illustrate yet another alternative method of the present invention utilizing erasure.
Figure 6B:
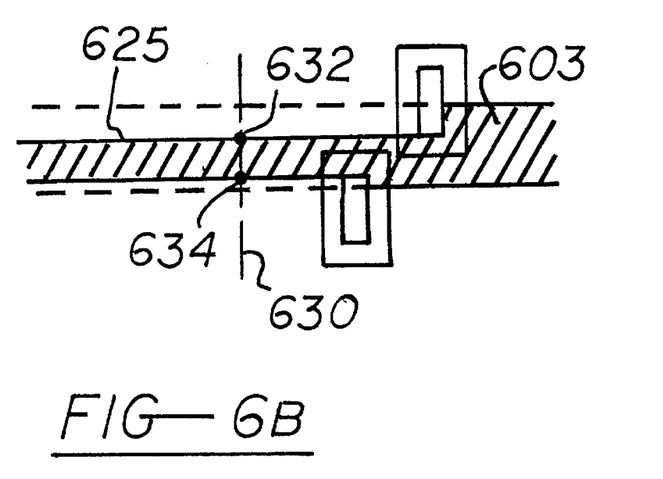
Figure 6C:
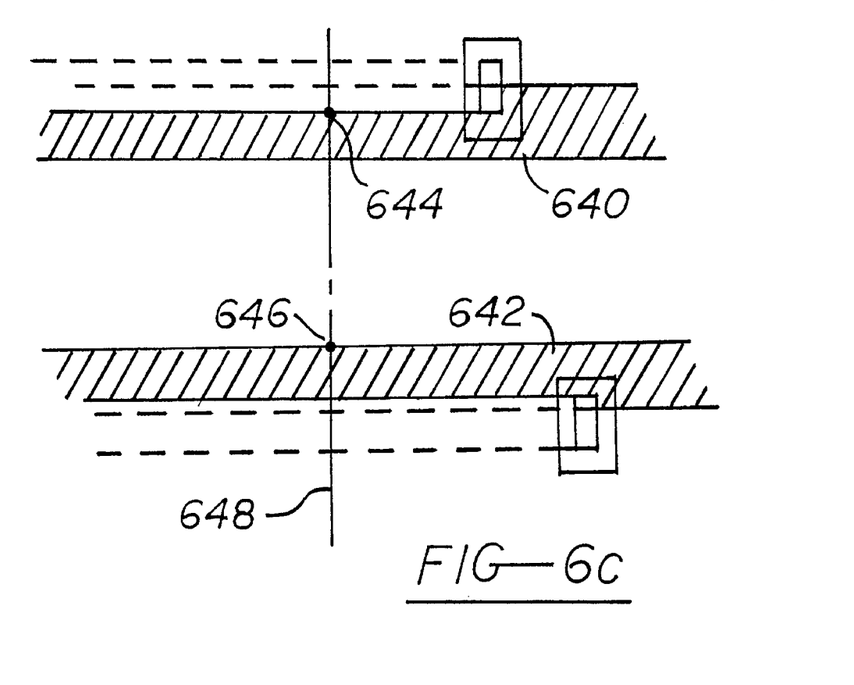
Figure 6D:
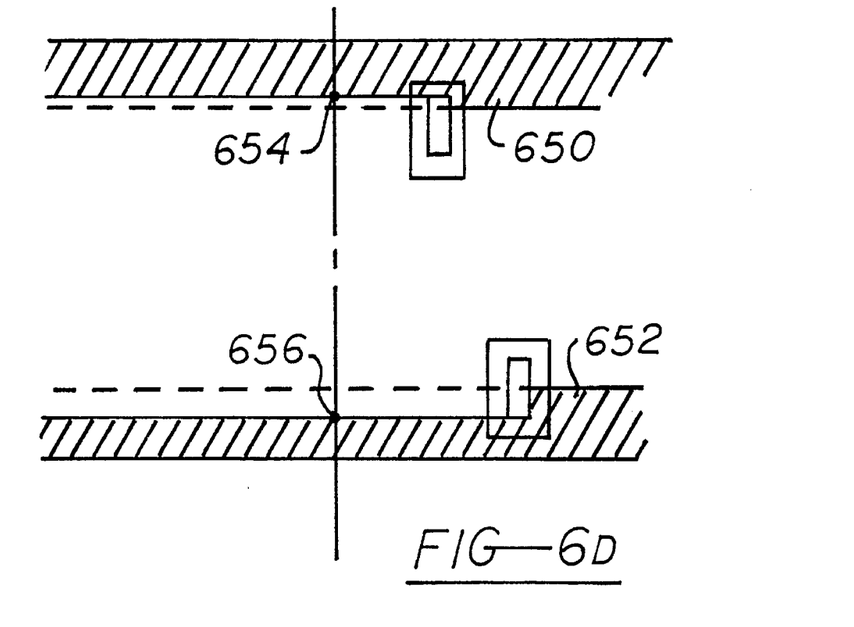
Figure 6E:
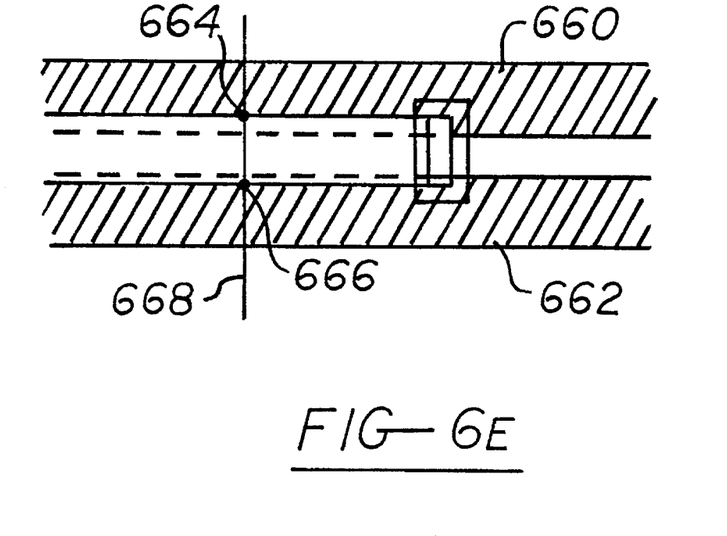

FIGS. 6A and 6E illustrate other, alternative methods of the present invention. Referring to FIG. 6A, a longitudinal stripe 602 is written on tape 601 at a displacement 604 relative to a reference position 610. The tape is reversed and the write/erase head 612 is shifted laterally to a displacement 616 such that at least a portion of stripe 602 is longitudinally erased, creating a new edge 620. Next, the read head is moved laterally for example along broken 622 in order to locate edge 620 at point 624. An offset error may be determined in accordance with the method previously described in associated with FIG. 4, but in this case, the anticipated value of "D", again assuming a zero-amplitude output, will typically be equal to one half the transverse width of the write/erase head minus one half of the transverse width of the read head.

FIG. 6B shows an alternative wherein the tape is reversed once more so as to erase at least a second longitudinal portion of the other side of a stripe 603, creating a second new edge 625. The read head is then moved along line 630 so as to locate points 632 and 634. For each edge, an offset error is determined in accordance with the method previously described with regard to FIG. 4, and a total offset error can be calculated by taking the average of the values associated with the two edges 632 and 634. Assuming same anticipated value of "D", this use of the two newly created edges will result in a total offset error independent of the value of "D".

FIGS. 6C through 6E show alternative techniques utilizing erasure and two edges in each case created through erasure, resulting in a total offset error substantially independent of the anticipated "D" value. In FIG. 6C, two stripes 640 and 642 are written along the tape regardless of their lateral disposition, in fact, two stripes may be overlapping. In any event, points 644 and 646 are located by moving the read head along line 648 and a total offset error is calculated by taking the average value of the correction factors associated with the points 644 and 646, knowing all of the displacement values associated with the various writing and erasing processes.

FIG. 6D shows yet another alternative embodiment of the present invention utilizing erase, in this case two inwardly facing portions of stripes 650 and 652 being erased with erased with the write/erase head. In this case, the read head is moved laterally across the tape, for example along broken line 658 so as to locate points 654 and 656 associated with the inwardly facing edges created through erasure. Again, a total correction factor may be calculated which is substantially independent of the anticipated value of "D". In the alternative embodiment of FIG. 6D, it is important that the displacements associated with the writing of the two stripes 650 and 652 be at least some non-incremental value, since if the two stripes are written at exactly the same place erasure at an identical displacement could obliterate both of the stripes, or at the least, cause edge detection to be unduly burdensome.

However, it may be that the two stripes are written laterally close to one another or even overlapping slightly, in which case the write/erase head may be used with one pass to simultaneously erase a longitudinal portion of both written stripes. Such a further alternative embodiment is depicted with regard to FIG. 6E, wherein stripes 660 and 662 have been written along the tape such that the distance between the inwardly facing edges of the two stripes is less than the total width of the write/erase head. With such a configuration, after the tape is reversed, the write head may be used to simultaneously erase inwardly facing portions of both stripes 660 and 662. The tape is again reversed and the read head is used to sense these inwardly facing edges created through erasure, for example along broken line 668, so as to locate points 664 and 666. In terms of the alternative embodiments of this invention utilizing erasure, of those independent of the value of "D" the embodiments shown in FIGS. 6B and 6E are those preferred, since only three write/erase passes are required along the tape, whereas, in FIGS. 6C and 6D, four passes of the write/erase head are required prior to edge detection with the read head. Of course, if the value of "D" is well known and trusted, the alternative of FIG. 6A is preferred, since only two passes with the write/erase head are specifically required in accordance with this invention prior to edge detection. The word "specifically" is used since, in a majority of cases, the area of the tape containing the stripe or stripes to be partially erased may have to be initially erased in order to ensure a clean detection of the correct edge or edges without ambiguity.

Having this described my invention, I claim:

1. In a multi-track tape drive having at least one read head and one write/erase head, the heads being displaceable laterally with respect to the movement of tape travel, and a memory operative to store signals representative of the displacements of the heads, a method of calculating alignment error, comprising the steps of:

(a) recording with said write/erase a longitudinal stripe having first and second edges at a displacement along at least a portion of said tape;

(b) storing the displacement associated with step (a) as value "A";

(c) locating, with said read head, one of said first and said second edges of said longitudinal stripe;

(d) storing the resulting displacement associated with step (c) as displacement value "B";

(e) determining and storing an expected offset "D" between the value of "A" and the value of "B" as a function of the width of said read and said write/erase heads; and (f) calculating an alignment error "E" in accordance with the following formula:

$$E = (A \pm D - B)$$

wherein the choice of whether to use + or − depends upon which of said first and said second edges are located in step (c).

2. The method of claim 1, further including the step of positioning the write head onto a desired track using a displacement value adjusted in accordance with said alignment error.

3. The method of claim 1 wherein "D" is equal to one-half the transverse width of the read head plus one half the transverse width of the write/erase head.

4. The method of claim 1, including the steps of:

calculating a first alignment error associated with one edge of the longitudinal stripe recorded in step (a);

calculating a second alignment error associated with the other edge of the longitudinal stripe recorded in step (a);

calculating a total alignment error by averaging said first and second alignment errors; and positioning the write head onto a desired track using a displacement value adjusted in accordance with said total alignment error.

5. The method of claim 1, further including the steps of:

recording a second longitudinal stripe, spaced apart from and along the same portion of the tape as the stripe recorded in step (a);

locating, with said read head, one of the following:

the edge of the second stripe furthest from the reference if the edge of the first stripe previously located with the read head in step (c) was that closest to the reference, or the edge of the second stripe closest to the reference if the edge of the first stripe previously located with the read head in step (c) was that furthest from the reference;

calculating a first alignment error associated with the edge located with respect to the first longitudinal stripe;

calculating a second alignment error associated with the edge located with respect to the second longitudinal stripe; and calculating said total alignment error by averaging said first and second alignment errors.

6. The method of claim 5, further including the step of positioning the write head onto a desired track using a displacement value adjusted in accordance with said total alignment error.

7. In a multi-track tape drive having a read head and a write/erase head, a head-positioning method comprising the steps of:

positioning the write/erase head at a distance $A_1$ relative to a reference;

recording a first longitudinal stripe on the tape;

sensing the edge of the stripe furthest from said reference with the read head;

defining the position of the read head upon sensing the location of said edge as a distance $B_1$ relative to said reference;

determining an anticipated offset value D as a function of the widths of said read and said write/erase heads; and calculating an alignment error $E_1 = (A_1 - D - B_1)$.

8. The method of claim 7, further including the step of positioning the write head onto a desired track at a displacement equal to the algebraic sum of the alignment error and the displacement associated with the read head when used to sense the edge of the stripe.

9. The method of claim 7, wherein the anticipated offset value D is equal to one-half the transverse width of the read head plus one-half the transverse width of the write/erase head.

10. The method of claim 7, further including the steps of:

positioning the write/erase head at a distance $A_2$ relative to the reference;

recording a second longitudinal stripe on the tape;

locating the edge of said second longitudinal stripe closest to said reference with said read head;

defining the position of the read head upon the location of said edge as a distance $B_2$ relative to said reference;

calculating a second alignment error $E_2 = (A_2 + D - B_2)$; and determining a final alignment error E as the average value of $E_1$ and $E_2$; and positioning the write head onto a desired track by adding the value of E to the displacement of the write/erase head associated with the desired track.

11. In a multi-track tape drive having a read head and a write/erase head, a head-positioning method comprising the steps of:

positioning the write/erase head at a distance $A_1$ relative to a reference;

recording a first longitudinal stripe on the tape;

sensing the edge of the stripe closest to said reference with the read head;

defining the position of the read head upon sensing the location of said edge as a distance $B_1$ relative to said reference;

determining an anticipated offset value D as a function of the widths of said read and said write/erase heads;

calculating an alignment error $E_1 = (A_1 - D - B_1)$; and positioning the write head onto a desired track at a displacement equal to the algebraic sum of the alignment error and the displacement associated with the read head when used to sense the edge of the stripe.

12. The method of claim 11, further including the steps of:

positioning the write/erase head at a distance $A_2$ relative to the reference;

recording a second longitudinal stripe on the tape;

locating the edge of said second longitudinal stripe furthest from said reference with said read head;

defining the position of the read head upon the location of said edge as a distance $B_2$ relative to said reference;

calculating a second alignment error $E_2=(A_2+D-B_2)$; and determining a final alignment error E as the average value of $E_1$ and $E_2$; and positioning the write head onto a desired track by adding the value of E to the displacement of the write/erase head associated with the desired track.

13. The method of claim 11, wherein the anticipated offset value D is equal to one-half the transverse width of the read head plus one-half the transverse width of the write/erase head.

14. In a multi-track tape drive having at least one read head and one write/erase head, the heads being displaceable laterally with respect to the movement of tape travel, and a memory operative to store signals representative of the displacement of the heads, a method of calculating alignment error, comprising the steps of:

(a) recording, with said write/erase head, a longitudinal stripe having two opposing written sides along at least a portion of said tape;

(b) reversing tape travel and, using said write/erase head, erasing a longitudinal portion of one of the sides of the stripe written in step (a), thereby creating a new edge through erasure;

(c) storing the resulting displacement associated with step (b) as a value "A";

(d) locating the new edge with said read head;

(e) storing the displacement associated with the location of the new edge as a value "B";

(f) determining and storing an expected offset value "D" between the value of "A" and the value of "B" as a function of the width of said read head and said write/erase head; and (g) calculating an alignment error "E" in accordance with the formula:

$$E=(A\pm D-B),$$

wherein the choice of whether to use + or − depends upon which side of the written stripe was used to create the new edge.

15. The method of claim 14, wherein "D" is equal to one-half the transverse width of the write head minus one-half the transverse width of the read head.

16. The method of claim 14, further including the steps of:

(h) reversing tape travel and, using said write/erase head, erasing a second longitudinal portion of the stripe written in step (a), thereby creating a second new edge through erasure on the side of said stripe opposite to that used to create the new edge in step (b);

(i) storing the displacement associated with step (h);

(j) locating said second new edge with said read head;

(k) storing the displacement associated with the location of the second new edge;

(l) calculating an alignment error "E" in accordance with the formula given in step (g); and (m) determining a final alignment error as the average of the alignment errors associated the two opposing edges created through erasure.

17. The method of claim 16, further including the step of positioning the write head onto a desired track using a displacement value adjusted as a function of the final alignment error.

18. In a multi-track tape drive having at least one read head and one write/erase head, the heads being displaceable laterally with respect to the movement of tape travel, and a memory operative to store signals representative of the displacement of the heads, a method of calculating alignment error, comprising the steps of:

(a) recording, with said write/erase head, two spaced-apart longitudinal stripes along the same portion of said tape;

(b) using said write/erase head, erasing either:

a portion of each outwardly facing edge of each stripe, or a portion of the each inwardly facing edge of each stripe;

(c) storing the displacement values associated with the position of the write/erase head during the erasure of the two edges in step (b) as $A_1$ and $A_2$;

(d) locating the edges created in step (b) using the read head;

(e) storing the displacement values associated with the position of the read head during the location of the two edges in step (d) as $B_1$ and $B_2$;

(f) determining and storing an expected offset value D equal to one-half the transverse width of the write head minus one-half the transverse width of the read head; and (g) calculating an alignment error associated with each edge created in step (b) according to the formulas:

$$E_1=(A_1\pm D-B_1)$$

and $$E_2=(A_2\pm D-B_2),$$

the choice of "+" or "−" depending upon whether A, and B, are associated with the stripe closest to, or furthest from the reference position; and determining a final alignment error "E" by averaging $E_1$ and $E_2$.

19. The method of claim 18, further including the step of positioning the write head onto a desired track using a displacement value adjusted as a function of the final alignment error "E".

20. The method of claim 18, wherein:

step (a) includes recording the two stripes such that their associated displacement values do not exceed two times the transverse width of the write head; and step (b) includes simultaneously erasing a portion of each inwardly facing portion of the two stripes with a single pass of the write/erase head.

* * * * *